US011296997B2

(12) United States Patent
Yuan et al.

(10) Patent No.: US 11,296,997 B2
(45) Date of Patent: Apr. 5, 2022

(54) SDN-BASED VPN TRAFFIC SCHEDULING METHOD AND SDN-BASED VPN TRAFFIC SCHEDULING SYSTEM

(71) Applicant: CHINA UNIONPAY CO., LTD., Shanghai (CN)

(72) Inventors: Hang Yuan, Shanghai (CN); Lijun Zu, Shanghai (CN); Jintan Wu, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/043,237

(22) PCT Filed: Jul. 8, 2019

(86) PCT No.: PCT/CN2019/094985
§ 371 (c)(1),
(2) Date: Sep. 29, 2020

(87) PCT Pub. No.: WO2020/134017
PCT Pub. Date: Jul. 2, 2020

(65) Prior Publication Data
US 2021/0021537 A1    Jan. 21, 2021

(30) Foreign Application Priority Data

Dec. 25, 2018   (CN) .......................... 201811589642.4

(51) Int. Cl.
*H04L 12/869* (2013.01)
*H04L 47/60* (2022.01)
(Continued)

(52) U.S. Cl.
CPC .......... *H04L 47/60* (2013.01); *H04L 12/4641* (2013.01); *H04L 41/0806* (2013.01);
(Continued)

(58) Field of Classification Search
None
See application file for complete search history.

(56) References Cited

U.S. PATENT DOCUMENTS

| 8,955,112 B2 | 2/2015 | Nguyen et al. |
| 9,407,544 B1 | 8/2016 | Maino et al. |

(Continued)

FOREIGN PATENT DOCUMENTS

| CN | 1507230 A | 6/2004 |
| CN | 102394828 A | 3/2012 |

(Continued)

OTHER PUBLICATIONS

International Search Report dated Oct. 9, 2019 issued for International PCT Application No. PCT/CN2019/094985.
(Continued)

*Primary Examiner* — Christine T Duong
(74) *Attorney, Agent, or Firm* — K&L Gates LLP

(57) ABSTRACT

The present disclosure relates to an SDN-based VPN traffic scheduling method and scheduling system. The method includes: configuring an SDN switching device to implement establishment of a communication link between a CE device and a PE device; performing VPN configuration on a controller; distributing, by the controller, a corresponding flow table to the SDN switching device, the flow table being used to translate a repeated address within a VPN to a non-conflict space address to distinguish different VPN traffic; configuring, by the controller, different traffic scheduling paths for the different VPN traffic according to a preset traffic scheduling strategy; and distributing, by the controller, the traffic scheduling paths to the PE device.

13 Claims, 4 Drawing Sheets

(51) Int. Cl.
    *H04L 12/46*     (2006.01)
    *H04L 41/0806*   (2022.01)
    *H04L 45/00*     (2022.01)
    *H04L 45/64*     (2022.01)
    *H04L 45/745*    (2022.01)
    *H04L 47/20*     (2022.01)

(52) U.S. Cl.
    CPC .............. *H04L 45/38* (2013.01); *H04L 45/64* (2013.01); *H04L 45/745* (2013.01); *H04L 47/20* (2013.01)

(56) References Cited

U.S. PATENT DOCUMENTS

| | | | |
|---|---|---|---|
| 2014/0189074 A1* | 7/2014 | Parker | H04L 67/1002 |
| | | | 709/220 |
| 2017/0237767 A1 | 8/2017 | George et al. | |
| 2017/0289027 A1 | 10/2017 | Ratnasingham | |
| 2017/0359310 A1* | 12/2017 | Jameson | H04L 45/02 |

FOREIGN PATENT DOCUMENTS

| | | |
|---|---|---|
| CN | 104158745 | 11/2014 |
| CN | 104253751 A | 12/2014 |
| CN | 105791153 A | 7/2016 |
| CN | 106713137 | 5/2017 |
| CN | 107026791 | 8/2017 |
| CN | 103548376 B | 7/2018 |
| CN | 108322391 | 7/2018 |
| WO | WO 2017/193848 A1 | 11/2017 |

OTHER PUBLICATIONS

First Office Action and Search Report dated Mar. 3, 2021 for Chinese Patent Application No. 201811589642.4.
First Office Action dated Apr. 22, 2020 for Taiwan Patent Application No. 108125094.

* cited by examiner

SDN-BASED VPN TRAFFIC SCHEDULING METHOD AND SDN-BASED VPN TRAFFIC SCHEDULING SYSTEM

CROSS-REFERENCE TO RELATED APPLICATION

This application is a National Stage of International Application No. PCT/CN2019/094985, filed on Jul. 8, 2019, which claims priority to Chinese Patent Application No. 201811589642.4, filed on Dec. 25, 2018, both of which are hereby incorporated by reference in their entireties.

TECHNICAL FIELD

The present disclosure relates to communication technology, in particular to an SDN-based VPN traffic scheduling method and an SDN-based VPN traffic scheduling system.

BACKGROUND

Multiple different users may be carried on a basic cross-data-center network, and traffic among the different users is strictly isolated. When the traffic of the different users is transmitted on the network, VPN technology may be used to distinguish the traffic of the different users. A controller may support isolation of routing areas of different tenants through VPN on an edge router, and realize dynamic management of VPN instances through mapping between router ports and the VPN instances.

In order to achieve traffic engineering, the cross-center network often plans a traffic path by establishing a tunnel. At present, users' requirements for network traffic are becoming more and more refined, often in particular operating on a certain application traffic. In this case, a five-tuple-based traffic guiding means within the VPN is becoming more and more important.

Then, in the current VPN environment, the traffic guiding can be implemented through tunnel strategy, route coloring, and service level. The traffic guiding through the tunnel strategy and static route can only achieve overall traffic guiding of the entire VPN traffic, and the route coloring can only achieve traffic guiding based on destination IPs. Although the service level can be refined to five-tuples, the number is only 8, which can not meet actual use requirements.

In a typical non-VPN environment, a five-tuple-based traffic guiding can be realized by means of strategy routing. However, in the VPN environment, strategy routing is found to be inapplicable after verification: after the strategy routing is used in traffic guiding, a message may lose VPN-related information, leading to failure in receipt of the information by a peer.

The disclosure in the background of the present disclosure is only intended to increase the understanding of the overall background of the present disclosure, and should not be regarded as an admission that or in any form suggesting that the disclosure constitutes the prior art which is already known to those ordinary skilled in the art.

SUMMARY

An SDN-based VPN traffic scheduling method is provided. An aspect of the present disclosure provides an SDN-based VPN traffic scheduling method, characterized by using an SDN switching device and a controller to implement VPN traffic scheduling between a CE device and a PE device, the method comprising: an initialization step, comprising configuring the SDN switching device to implement establishment of a communication link between the CE device and the PE device; a VPN configuration step, comprising performing VPN configuration on the controller; an address translation flow table distribution step, comprising distributing, by the controller, a corresponding flow table to the SDN switching device, wherein the flow table is used to translate a repeated address within a VPN to a non-conflict space address to distinguish different VPN traffic; a VPN traffic scheduling step, comprising configuring, by the controller, different traffic scheduling paths for the different VPN traffic according to a preset traffic scheduling strategy; and a configuration distribution step, comprising distributing, by the controller, the traffic scheduling paths to the PE device.

Optionally, the flow table is to perform a space address translation within the VPN using the non-conflict space address.

Optionally, the space address comprises one or a combination of: a source IP address, a source MAC address, a destination MAC address, a source port, a destination port, and a destination IP address.

Optionally, in the VPN configuration step, the controller is to manage a mapping relationship between the VPN and an interface of the SDN switching device and allocate space addresses based on different VPNs, wherein the mapping relationship is to indicate that different CE devices belong to different VPNs and different CE devices connected to the interface of the SDN switching device receive different VPN traffic.

Optionally, the address translation flow table distribution step comprises: obtaining, by the controller, information of a port via which a message enters the SDN switching device, and then determining which VPN the message belongs to according to the mapping relationship; obtaining an IP address pool of the VPN, obtaining an IP address sequentially or randomly, and labeling the obtained IP address as unavailable; and generating, according to the obtained IP, the corresponding flow table and distributing the corresponding flow table to the SDN switching device.

An aspect of the present disclosure provides an SDN-based VPN traffic scheduling system, characterized by comprising: a first type of routing device; a second type of routing device disposed separately from the first type of routing device; an SDN switching device disposed between the first type of routing device and the second type of routing device and configured to implement establishment of a communication link between the first type of routing device and the second type of routing device; and a controller configured to perform a centralized control of the SDN switching device according to a specified protocol to implement scheduling of VPN traffic.

Optionally, the first type of routing device is a CE device, and the second type of routing device is a PE device.

Optionally, the controller is configured to perform the centralized control of the SDN switching device through an Openflow protocol and a NETCONF protocol.

Optionally, the controller is configured to distribute a corresponding flow table to the SDN switching device, wherein the flow table is used to translate a repeated address within a VPN to a non-conflict space address to distinguish different VPN traffic.

Optionally, the space address comprises one or a combination of: a source IP address, a source MAC address, a destination MAC address, a source port, a destination port, and a destination IP address.

Optionally, the SDN switching device is configured to establish a one-to-one communication link between the first type of routing device and the second type of routing device.

Optionally, wherein the controller comprises: a VPN management module configured to implement VPN information management, port mapping relationship management, and IP address pool management; a forwarding strategy management module configured to implement switcher request processing, forwarding strategy generation, and forwarding strategy distribution; and a traffic guiding management module configured to implement traffic guiding strategy management and traffic guiding configuration distribution.

An aspect of the present disclosure provides a computer-readable medium having a computer program stored thereon, which, when executed by a processor, implements the above SDN-based VPN traffic scheduling method.

An aspect of the present disclosure provides a computer device, comprising a memory, a processor, and a computer program stored on the memory and executable on the processor, wherein the processor is to implement the above SDN-based VPN traffic scheduling method when the computer program is executed by the processor.

According to the present disclosure, with the SDN switching device connected between the CE device and the PE device, it is possible to modify the source space address (for example, IP address) of the traffic before it enters the PE device and after it leaves the PE device, so that the traffic scheduling among the PE devices does not need to consider the existence of VPN. As a result, flexible scheduling of traffic can be realized based on strategy routing, etc., compatibility with most manufacturers' device can be implemented, and restriction on the number of traffic caused by service quality level can be broken.

Other features and advantages of the method and apparatus of the present disclosure will be described more clearly or thoroughly through accompanying drawings incorporated herein along with subsequent specific embodiments for explaining certain principles of the present disclosure.

DETAILED DESCRIPTION

Some of multiple embodiments of the present disclosure described below are intended to provide a basic understanding of the present disclosure. It is not intended to confirm key or decisive elements of the present disclosure or limit the protection scope.

Before describing the present disclosure, some technical terms in the present disclosure will be briefly described.

(1) SDN (Software Defined Network)

(2) VPN (Virtual Private Network)

It is an innovative architecture of an Emulex network which is a new network and it is a way to realize network virtualization. Its core technology, Openflow, separates a control plane from a data plane of a network device. As a result, flexible control of network traffic can be realized, which makes the network more intelligent as a pipeline.

(3) Tunnel Technology

A tunnel is similar to a point-to-point connection. In this way, network services from many information sources can be transmitted through different tunnels in the same infrastructure.

(4) Strategy Routing

Strategy routing is a behavior at a forwarding level. The object of the operation is a data packet, and a data stream is matched. Specifically, it refers to each field in the data packet. A five-tuple is commonly used: a source IP, a destination IP, a protocol, a source port, and a destination port.

(5) PE (Provider Edge)

That is, an edge device of Provide, or an edge router of a service provider's backbone network. It is equivalent to a label edge router (LER). In the concept of VPN, routers in the entire network may be divided into three categories: customer edge router (CE), provider edge router (PE) and provider backbone router (P). The PE may act as an IP VPN access router, a PE router may connect a CE router and a P router, and thus it is the most important network node. User traffic may flow into a user network through the PE router, or flow into an MPLS backbone network through the PE router.

(6) CE (Customer Edge)

It is a customer edge device, or a customer-side router connected to the service provider. The CE router may provide users with service access by connecting one or more PE routers. The CE router is usually an IP router, which establishes an adjacency with the connected PE router(s).

(7) VPN Instance (VPN-INSTANCE)

The principle of VPN instance is to virtualize a physical device into multiple virtual devices, and allocate a corresponding physical interface(s) to the virtual devices for use, thereby achieving complete isolation between the virtual devices and between the virtual devices and the root physical device. Moreover, each logical device is independent from one another. It use its own independent routing table, independent process, and independent interface for entry and exit.

Figure 1:
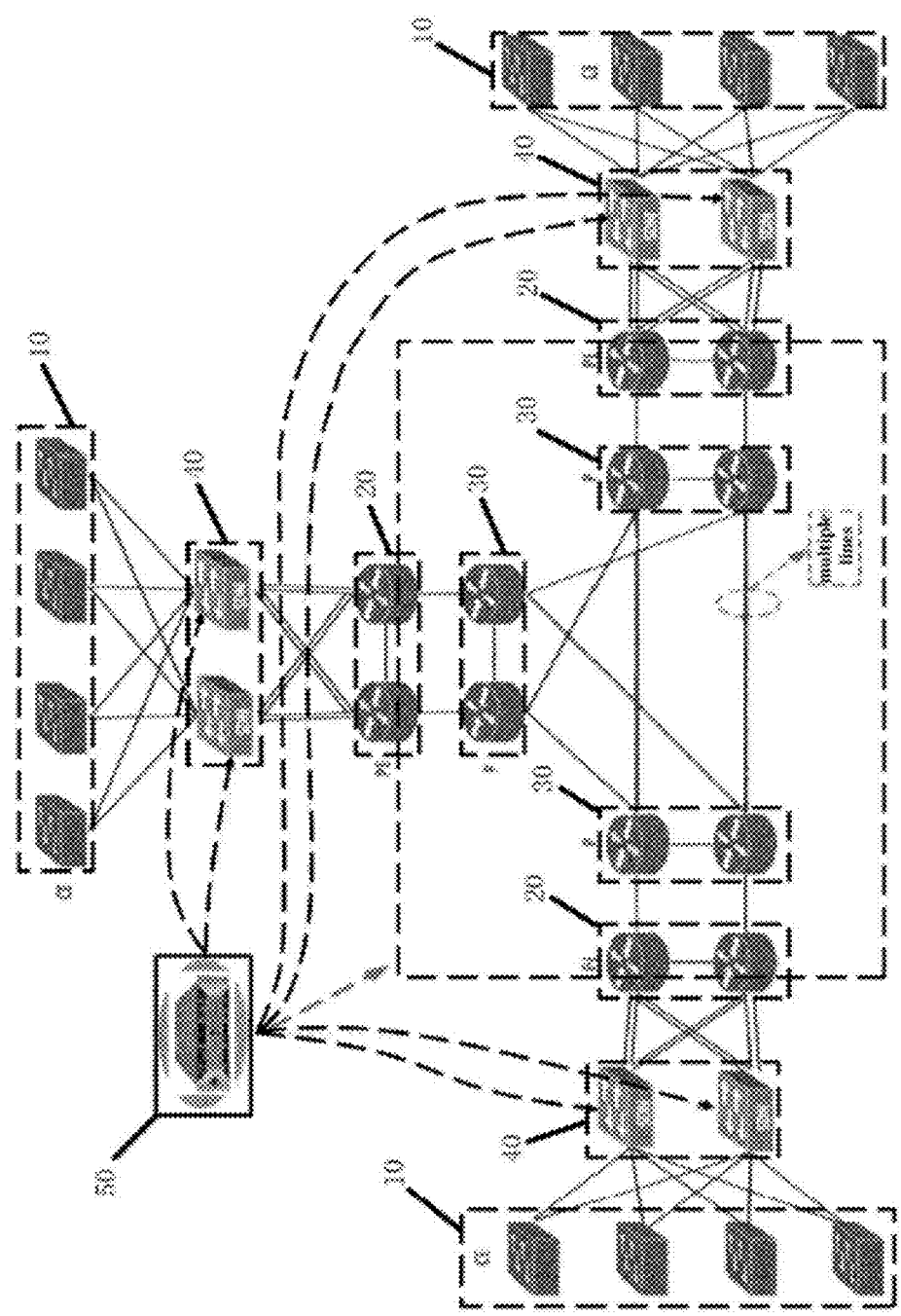
FIG. 1 is a block diagram showing a structure of an SDN-based VPN traffic scheduling system according to a first embodiment of the present disclosure.

FIG. 1 is a block diagram showing a structure of an SDN-based VPN traffic scheduling system according to a first embodiment of the present disclosure.

As shown in FIG. 1, in the SDN-based VPN traffic scheduling system of the first embodiment of the present disclosure, a PE device 20 is connected between a CE device 10 and a P device 30. In particular, an SDN switching device 40 is further disposed between the CE device 10 and the PE device 20 to realize scheduling of VPN traffic. Meanwhile, under the centralized control of a VPN traffic scheduling controller 50 (hereinafter referred to as the "controller"), the VPN traffic may be mapped, through the SDN switching device 40, to a space address where the IP does not conflict. The "multiple lines" in FIG. 1 means that there may be more than one interconnection line.

Further, in the present disclosure, there is no need to consider VPN for the traffic scheduling between the PE devices 20, so that multiple traffic guiding methods such as strategy routing can be flexibly adopted to realize flexible scheduling for traffic guiding of cross-data center traffic.

In particular, the SDN switching device 40 provided between the CE device 10 and the PE device 20 is a key factor of the present disclosure, and it may mainly provide the following two functions:

(1) It serves as a data forwarding channel between the CE device 10 and the PE device 20. The number of connections between the SDN switching device 40 and the CE device 10 is the same as that between the SDN switching device 40 and the PE device 20. Therefore, a one-to-one communication link(s) between the CE device 10 and the PE device 20 can be constructed to transparently forward network protocol data packet such as BGP. The CE device 10 and the PE device 20 may not perceive the presence of the SDN switching device 40.

(2) It maps data packets with repeated IP addresses within the VPN to a non-conflict space address: for the data packets from the CE device 10 to the PE device 20, the original $IP_1$ is changed to non-conflict $IP_2$; and for the data packets from the PE device 20 to the CE device 10, $IP_2$ is restored to the original $IP_1$.

Figure 2:
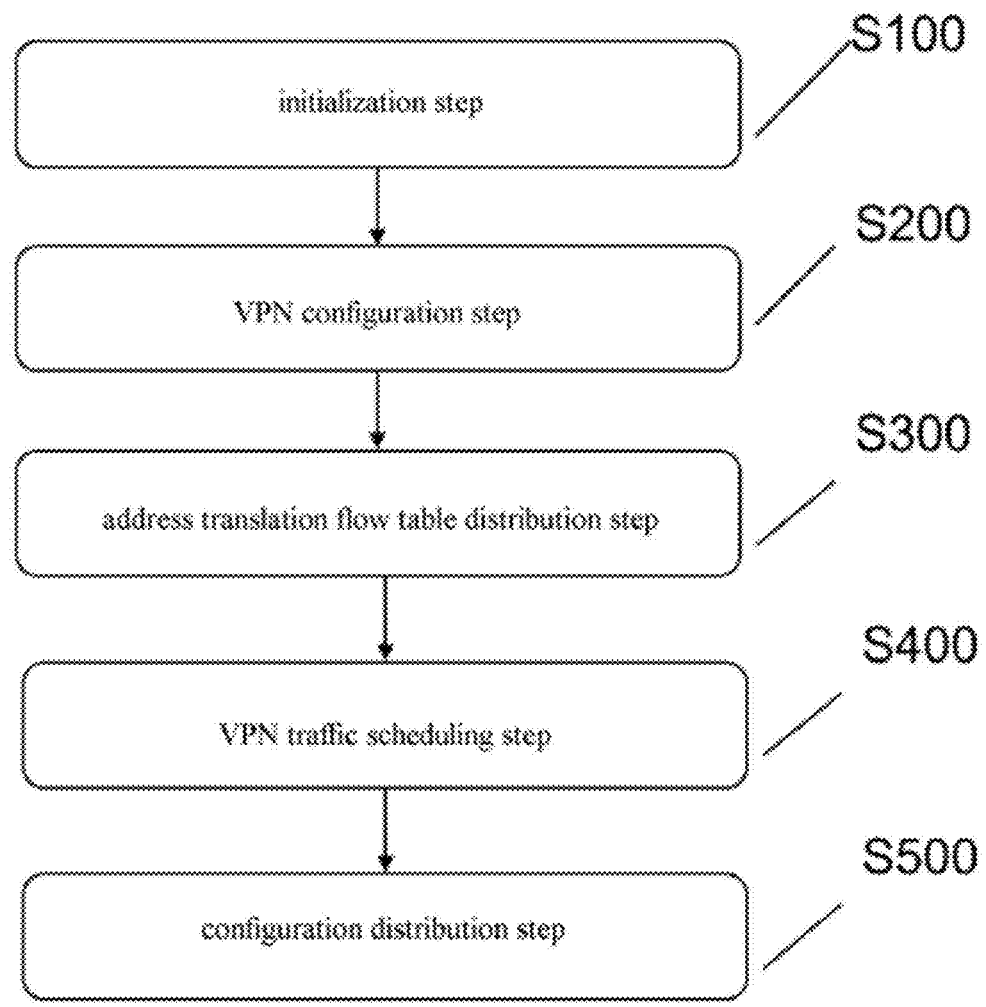
FIG. 2 is a flow chart showing an SDN-based VPN traffic scheduling method according to a first embodiment of the present disclosure.

FIG. 2 is a flow chart showing an SDN-based VPN traffic scheduling method according to a first embodiment of the present disclosure.

Below, the SDN-based VPN traffic scheduling method according to the first embodiment of the present disclosure will be described with reference to FIG. 1 and FIG. 2 together.

As shown in FIG. 2, the SDN-based VPN traffic scheduling method according to the first embodiment of the present disclosure includes the following steps:

an initialization step S100: configuring the SDN switching device 40 to implement establishment of a communication link between the CE device 10 and the PE device 20;

a VPN configuration step S200: configuring, on the controller 50, VPN, including a CE port, an SDN controller port, and an IP address pool corresponding to each VPN;

an address translation flow table distribution step S300: distributing, by the controller 50, a corresponding flow table to the SDN switching device 40 to translate a repeated address within the VPN to a non-conflict space address;

a VPN traffic scheduling step S400: configuring, on the controller 50, a traffic forwarding path for certain VPN traffic; and a configuration distribution step S500: distributing a routing rule(s) for the translated address(es) to the PE device(s) 20 for flexible traffic scheduling.

Next, these steps are described in detail.

(1) The Initialization Step S100

After connecting the CE device 10 and the PE device 20 through the SDN switching device 40 and establishing a management channel with the controller 50, the controller 50 may establish a control relationship with the SDN switching device 40. Since the SDN switching device 40 does not run any three-layer protocol, a communication link that is transparent to the CE device 10 and the PE device 20 can be constructed.

(2) The VPN Configuration Step S200

VPN configuration is performed in this step. There are three main tasks for VPN configuration, as follows:

1̂ Managing VPN data

The controller 50 may manage all VPN information in the network. This information is basic data, and all upper-level functions are implemented based on this data.

2̂ Managing mapping relationship between the VPN and an interface of the SDN switching device.

The mapping relationship is generated on the connection interface with the CE device. Because different CE devices belong to different VPNs, the physical ports of different CE devices 10 that are connected to the SDN switching device 40 may receive traffic from different VPNs.

Figure 3:
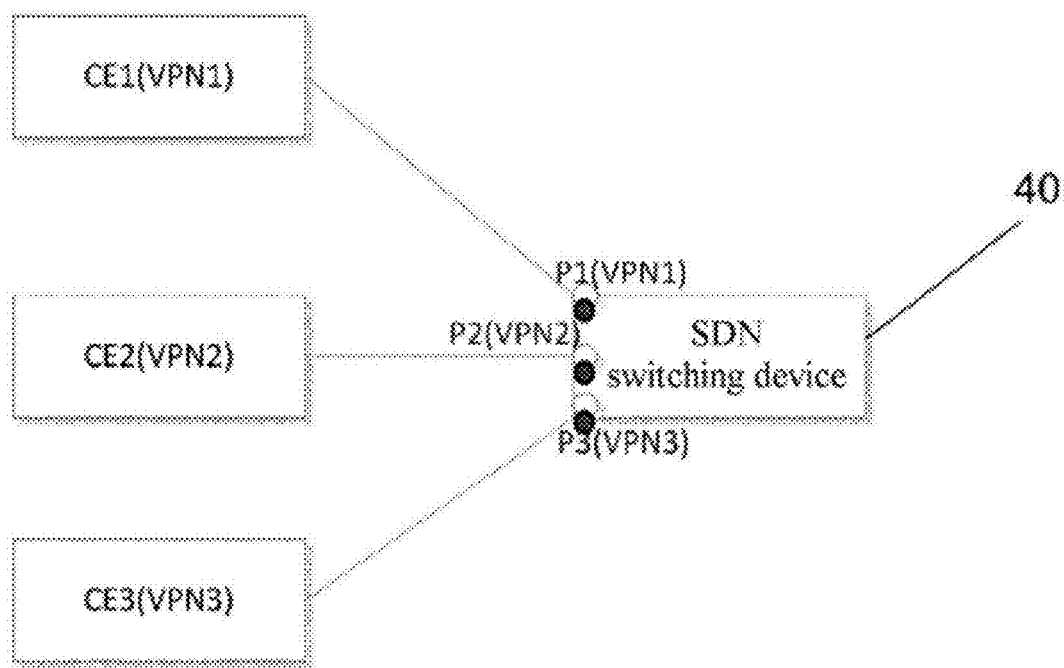
FIG. 3 is a diagram showing mapping relationship between ports of an SDN switching device and VPNs.

FIG. 3 is a diagram showing mapping relationship between ports of an SDN switching device and VPNs.

As shown in FIG. 3, as the CE devices 10, a first CE device, a second CE device, and a third CE device are illustrated. The first CE device belongs to VPN1, the second CE device belongs to VPN2, and the third CE device belongs to VPN3. On the other hand, the first CE device is connected to the P1 port of the SDN switching device 40 (that is, the traffic of the VPN1 is received), and the second CE device is connected to the P2 port of the SDN switching device 40 (that is, the traffic of the VPN2 is received). The third CE device is connected to the P3 port of the SDN switching device 40 (that is, the traffic of the VPN3 is received).

These relational data can be managed in the controller 50, so that it is known which VPN the data received by different ports belongs to.

Figure 4:
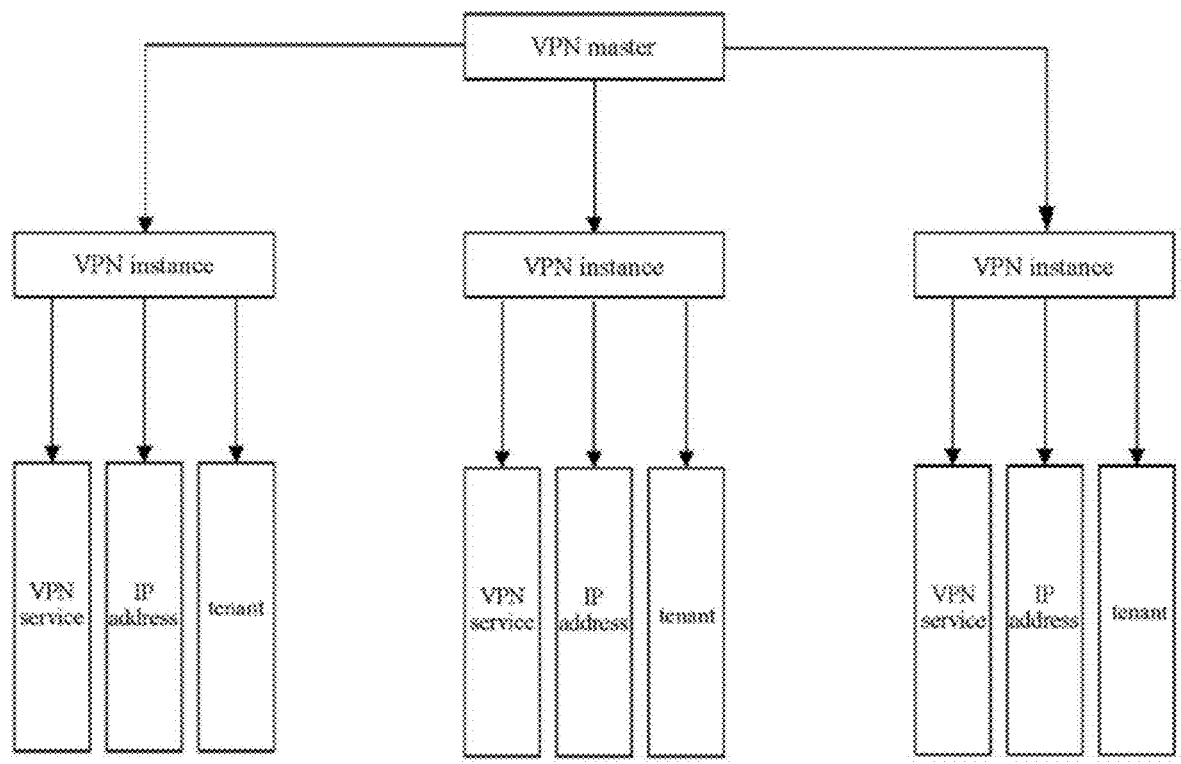
FIG. 4 is a schematic diagram showing a multi-VPN management model.

3̂ Allocating mapped IP address pools for different VPNs. FIG. 4 is a schematic diagram showing a multi-VPN management model. FIG. 4 is to illustrate a management method with multiple VPNs. As shown in FIG. 4, there are multiple VPN instances under a VPN master. Each VPN instance has a VPN service, an IP address, and a tenant. Because there are multiple VPN instances, it may be necessary to ensure that the address pools for the VPN instances do not conflict with each other when dividing the IP address pools. Each VPN may have its own independent IP resource.

In the present disclosure, the mapping IP address pool means that after different VPN messages pass through the SDN switching device 40, the source IP addresses of the messages will be mapped to different IP address pools according to a certain rule. The IP address pools of each VPN are continuous and do not overlap with the IP address pools of other VPNs. The number of IP address pools is configured and set by an administrator.

(3) The Address Translation Flow Table Distribution Step S300

When the SDN switching device 40 receives a data message from the VPN, since there is no forwarding flow table logic in the SDN switching device 40 at the beginning, the switching device may forward the message to the controller 50 to request a related forwarding strategy. After receiving the relevant message, the controller 50 may perform the following calculation processing:

1̂ First, the controller 50 reading the message, obtaining port information of the SDN switching device 40 via which the message enters, and then knowing which VPN the message belongs to according to the mapping relationship between ports and VPNs.

2̂ Obtaining an IP address pool of the VPN, obtaining an IP address sequentially or randomly, and labeling the obtained IP address as unavailable after obtaining it. In this way, subsequent messages will not use this IP for address translation.

3̂ Generating, according to the obtained IP, the corresponding flow table and distributing it to the SDN switching device 40. The content of the flow table is as follows: ip, in_port=i, nw_src=$IP_1$, actions=mod_nw_src=$IP_2$, output: j where port i is the port connected with the CE device 10, j is a connection port with the PE device 20, $IP_1$ is the original IP address of the message, and $IP_2$ is the translated address taken from the IP address pool.

At the same time, a corresponding reverse translation flow table may also be distributed to the SDN switching device 40 at the opposite end to restore the IP address. The content is as follows:

ip, in_port=m, nw_src=$IP_2$, actions=mod_nw_src=$IP_1$, output: n where ports m and n are connection ports between the PE device 20 and the CE device 10.

After the two flow tables are distributed, it can be realized that only the address(es) in the space addresses needs to be operated among the PE devices 20, without considering the existence of the VPN.

(4) The VPN Traffic Scheduling Step S400

Since there is no VPN between the PE devices 20 and the traffic of different VPNs has been segmented by dividing the IP address pool, the strategy routing can be used for traffic guiding. As a result, traffic guiding based on the five-tuple is achieved.

(5) The Configuration Distribution Step S500

In this step, for the traffic scheduling strategy configured in step S400, the controller 50 may generate a related configuration and distribute the traffic scheduling configuration. The IP address used is one of the converted space addresses.

Next, an exemplary VPN traffic scheduling system and VPN traffic scheduling method of the present disclosure will be described.

Figure 5:
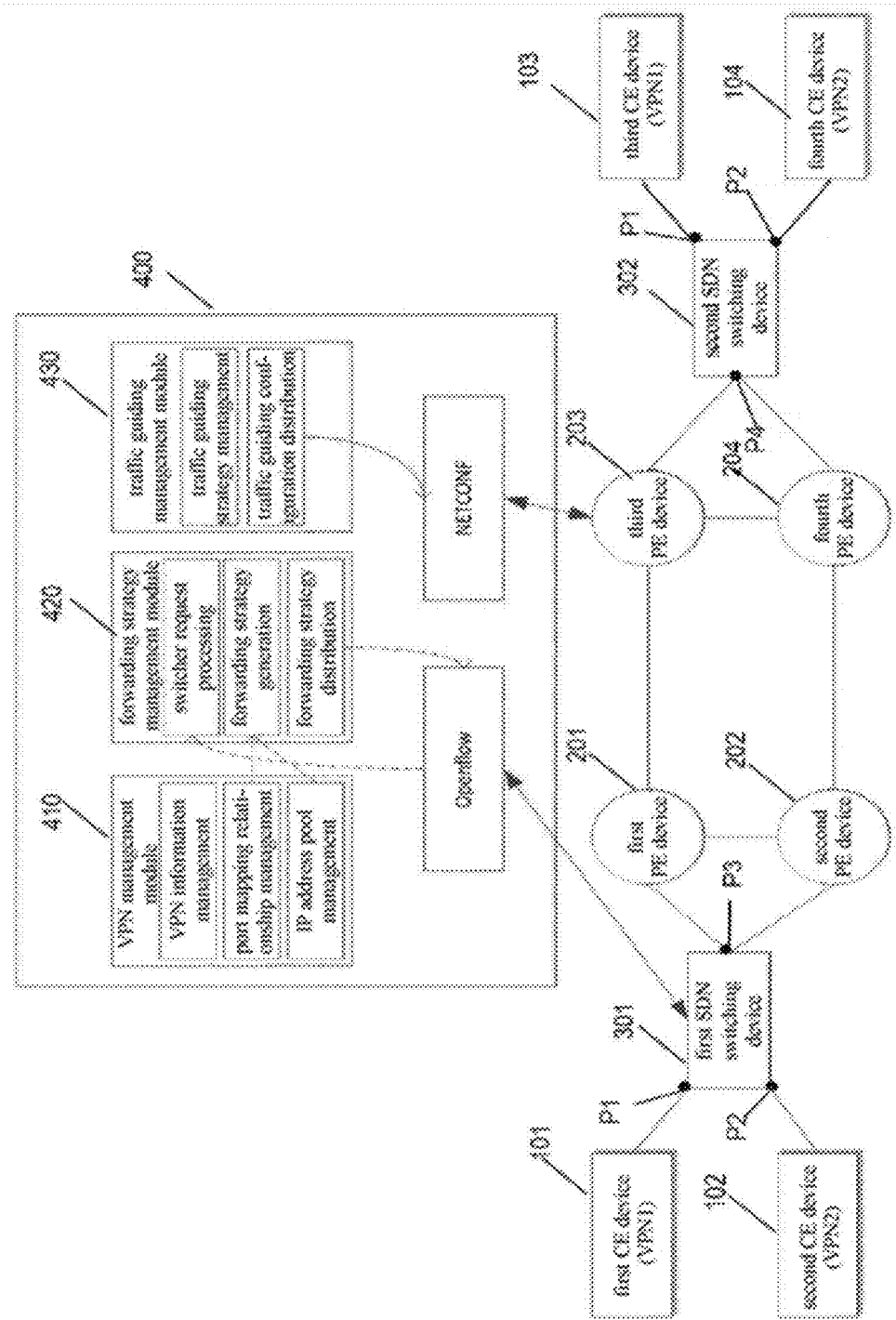
FIG. 5 is a schematic diagram showing the structure of a VPN traffic scheduling system according to an example of the present disclosure.

FIG. 5 is a schematic diagram showing the structure of a VPN traffic scheduling system according to an example of the present disclosure.

As shown in FIG. 5, in the VPN traffic scheduling system of this example, examples of CE devices include a first CE device 101, a second CE device 102, a third CE device 103, and a fourth CE device 104. Examples of PE devices include a first PE device 201, a second PE device 202, a third PE device 203, and a fourth PE device 204. Examples of SDN switching devices include a first SDN switching device 301 and a second SDN switching device 302.

The first SDN switching device 301 is provided between the first CE device 101 and the second CE device 102, and the first PE device 201 and the second PE device 202. The second SDN switching device 302 is provided between the third CE device 103 and the fourth CE device 104, and the third PE 203 and the fourth PE device 204. VPN traffic can be scheduled using the first SDN switching device 301, the second SDN switching device 302, and the controller 400.

Meanwhile, the VPN traffic scheduling controller 400 (hereinafter also referred to as "controller") may centrally control the first SDN switching device 301 and the second SDN switching device 302 through an Openflow protocol and a NETCONF protocol. Specifically, the VPN traffic scheduling controller 400 may include: a VPN management module 410 configured to implement VPN information management, port mapping relationship management, and IP address pool management; a forwarding strategy management module 420 configured to implement switcher request processing, forwarding strategy generation, and forwarding strategy distribution; and a traffic guiding management module 430 configured to implement traffic guiding strategy management and traffic guiding configuration distribution.

The VPN traffic scheduling method of this example may include the following steps:

(1) An Initialization Step

The first SDN switching device 301 is configured to implement establishment of communication links between the first CE device 101 and the second CE device 102, and the first PE device 201 and the second PE device 202. The second SDN switching device 302 is configured to implement establishment of communication links between the third CE device 103 and the fourth CE device 104, and the third PE device 203 and the fourth PE device 204.

(2) A VPN Configuration Step

As shown in FIG. 5, in this example, the VPN is configured on the controller 40, including a CE port, an SDN controller port, and an IP address pool corresponding to each VPN.

Specifically, two VPNs are configured in this example: VPN1 and VPN2. The first CE device 101 and the third CE device 103 of VPN1 are respectively connected to the P1 ports of the first SDN switching device 301 and the second SDN switching device 302, and the second CE device 102 and the fourth CE device 104 of VPN2 are respectively connected to the P2 ports of the first SDN switching device 301 and the second SDN switching device 302. The connection port between the first SDN switching device 301 and the first PE device 201 to the fourth PE device 204 is P3, and the connection port between the second SDN switching device 302 and the first PE device 201 to the fourth PE device 204 is P4.

Further, the administrator may allocate IP address pools for VPN1 and VPN2 respectively. VIP1: 1.1.1.1-1.1.1.254; VIP2: 2.2.2.1-2.2.2.254.

(3) An Address Translation Flow Table Distribution Step

When a data packet of the first CE device 101 with source IP of 192.168.1.1, destination IP of 192.168.2.1 and port number of 100 is sent to the first SDN switching device 301, since the first SDN switching device 301 has no forwarding strategy, at this time, the first SDN switching device 301 will distribute a request to the controller 400.

After receiving the request, the controller 400 may first determine that the message belongs to VPN1 according to the entry p1, retrieve a mapping IP: 1.1.1.1 from VIP1 according to certain logic (random, sequence, etc.), and then label the IP as used.

Subsequently, the forwarding strategy management module 410 in the controller 400 may use forwarding strategy generation function to generate an Openflow flow table as follows: the first SDN switching device 301:

ip, in_port=p1, nw_src=192.168.1.1, actions=mod_nw_src=1.1.1.1, output: p3 the second SDN switching device 302:

ip, in_port=p3, nw_src=1.1.1.1, actions=mod_nw_src=192.168.1.1, output: p1;

ip, in_port=p4, nw_src=1.1.1.1, actions=mod_nw_src=192.168.1.1, output: p1.

Then the flow table is distributed to the first SDN switching device 301 and the second SDN switching device 302.

After the first SDN switching device 301 and the second SDN switching device 302 receive the forwarding strategy, they forward the data packet. Due to the Openflow flow table, the source IP of the data packet received by the first PE device 201 and the second PE device 202 has been changed to 1.1.1.1.

After the data packet passes through the PE devices and arrives the second SDN switch 302, due to the Openflow flow table, the source IP address of the data packet will be reversed, restored to the original IP address of 192.168.1.1, and then sent to the third CE device 103. At this point, the transparent transmission of the data packet within the VPN in the enterprise cross-center network is completed.

Since there is no VPN in the PE node(s), all the traffic it sends is in a global state, so in the area of the PE node, the traffic scheduling in the enterprise wide area network can be completed by means of SR-based five-tuple traffic guiding.

At this time, the second CE device 102 also sends a data packet with the same IP elements, i.e., the source IP of 192.168.1.1, the destination IP of 192.168.2.1, and the port number of 100. Also, since the first SDN switching device 301 has no forwarding strategy, the first SDN switching device 301 will send a request to the controller 400 at this time.

After receiving the request, the controller 400 may first determine that the message belongs to VPN2 according to the entry p2, retrieve a mapping IP: 2.2.2.1 from VIP2 according to certain logic (random, sequence, etc.), and then label the IP as used.

The forwarding strategy management module 410 in the controller 400 may use forwarding strategy generation function to generate an Openflow flow table as follows: the first SDN switching device 301:

ip, in_port=p2, nw_src=192.168.1.1, actions=mod_nw_src=2.2.2.1, output: p3 the second SDN switching device 302:

ip, in_port=p3, nw_src=2.2.2.1, actions=mod_nw_src=192.168.1.1, output: p2;
ip, in_port=p4, nw_src=2.2.2.1, actions=mod_nw_src=192.168.1.1, output: p2.

Then the flow table is distributed to the first SDN switching device 301 and the second SDN switching device 302.

After the first SDN switching device 301 and the second SDN switching device 302 receive the forwarding strategy, they forward the data packet. Due to the Openflow flow table, the source IP of the data packet received by the third PE device 203 and the fourth PE device 204 has been changed to 2.2.2.1.

(4) a VPN Traffic Scheduling Step

As described above, the two data packets received by the first PE device 201, the second PE device 202, the third PE device 203 and the fourth and second device 204 are no longer messages of the same IP elements. Since the source addresses have been changed, the two data packets will not conflict during transmission. At this time, the administrator can use strategy routing to perform the five-tuple-based traffic guiding to the data packets. The strategy is expressed as follows:

if source IP=1.1.1.1, destination IP=192.169.2.1, port=100
    then the data packet is forwarded from tunnel 1
if source IP=2.2.2.1, destination IP=192.169.2.1, port=100
    then the data packet is forwarded from tunnel 2.

In this way, the traffic guiding capability based on five-tuple for different VPNs is completed.

(5) a Configuration Distribution Step

Routing rules for the translated addresses are distributed to the first PE device 201 to the fourth PE device 204 to perform flexible traffic scheduling.

Thus, in this example, under the centralized control of the VPN traffic scheduling controller 400, the first SDN switching device 301 and the second SDN switching device 302 map the VPN traffic to space addresses that do not conflict in IP. Furthermore, the traffic scheduling among the first PE device 201 to the fourth PE device 204 does not need to consider the VPN, so that multiple traffic guiding methods such as strategy routing can be flexibly used to implement flexible traffic guiding and scheduling of cross-data center traffic.

Thus, in this example, under the centralized control of the VPN traffic scheduling controller 400, the first SDN switching device 301 and the second SDN switching device 302 map the VPN traffic to space addresses that do not conflict in IP. Furthermore, the traffic scheduling among the first PE device 201 to the fourth PE device 204 does not need to consider the VPN, so that multiple traffic guiding methods such as strategy routing can be flexibly used to implement flexible traffic guiding and scheduling of cross-data center traffic.

The above examples mainly illustrate the VPN traffic scheduling system and VPN traffic scheduling method of the present disclosure. Although only some of the specific embodiments of the present disclosure have been described, those of ordinary skill in the art should understand that the present disclosure can be implemented in many other forms without departing from its spirit and scope. Therefore, the examples and implementations shown are regarded as illustrative rather than restrictive, and the present disclosure may cover various modifications and replacements without departing from the spirit and scope of the present disclosure as defined by the appended claims.

What is claimed is:

1. An Software Defined Network (SDN)-based Virtual Private Network (VPN) traffic scheduling method using an SDN switching device and a controller to implement VPN traffic scheduling between a Customer Edge (CE) device and a Provider Edge (PE) device, the method comprising:
   configuring the SDN switching device to implement establishment of a communication link between the CE device and the PE device;
   performing VPN configuration on the controller;
   distributing, by the controller, a corresponding flow table to the SDN switching device, wherein the flow table is used to translate a repeated address within a VPN to a non-conflict space address to distinguish different VPN traffic;
   configuring, by the controller, different traffic scheduling paths for the different VPN traffic according to a preset traffic scheduling strategy; and
   distributing, by the controller, the traffic scheduling paths to the PE device.

2. The SDN-based VPN traffic scheduling method according to claim 1, wherein the flow table is to perform a space address translation within the VPN using the non-conflict space address.

3. The SDN-based VPN traffic scheduling method according to claim 1, wherein the space address comprises one or a combination of: a source Internet Protocol (IP) address, a source Media Access Control (MAC) address, a destination MAC address, a source port, a destination port, and a destination IP address.

4. The SDN-based VPN traffic scheduling method according to claim 1, wherein the performing VPN configuration on the controller further comprises: managing, by the controller, a mapping relationship between the VPN and an interface of the SDN switching device and allocating space addresses based on different VPNs, wherein the mapping relationship is to indicate that different CE devices belong to different VPNs and different CE devices connected to the interface of the SDN switching device receive different VPN traffic.

5. The SDN-based VPN traffic scheduling method according to claim 4, wherein the distributing, by the controller, a corresponding flow table to the SDN switching device further comprises:
   obtaining, by the controller, information of a port via which a message enters the SDN switching device, and then determining which VPN the message belongs to according to the mapping relationship;
   obtaining an IP address pool of the VPN, obtaining an IP address sequentially or randomly, and labeling the obtained IP address as unavailable; and generating, according to the obtained IP, the corresponding flow table and distributing the corresponding flow table to the SDN switching device.

6. An SDN-based VPN traffic scheduling system, comprising:
   a first type of routing device;
   a second type of routing device disposed separately from the first type of routing device;
   an SDN switching device disposed between the first type of routing device and the second type of routing device and configured to implement establishment of a communication link between the first type of routing device and the second type of routing device; and
   a controller configured to perform a centralized control of the SDN switching device according to a specified protocol to implement scheduling of VPN traffic,
   wherein the controller is further configured to distribute a corresponding flow table to the SDN switching device, wherein the flow table is used to translate a repeated address within a VPN to a non-conflict space address to distinguish different VPN traffic.

7. The SDN-based VPN traffic scheduling system according to claim 6, wherein the first type of routing device is a CE device, and the second type of routing device is a PE device.

8. The SDN-based VPN traffic scheduling system of claim 6, wherein the controller is configured to perform the centralized control of the SDN switching device through an Openflow protocol and a Network Configuration (NETCONF) protocol.

9. The SDN-based VPN traffic scheduling system according to claim 6, wherein the space address comprises one or a combination of: a source IP address, a source MAC address, a destination MAC address, a source port, a destination port, and a destination IP address.

10. The SDN-based VPN traffic scheduling system of claim 6, wherein the SDN switching device is configured to establish a one-to-one communication link between the first type of routing device and the second type of routing device.

11. The SDN-based VPN traffic scheduling system according to claim 6, wherein the controller further comprises:
    a VPN management module configured to implement VPN information management, port mapping relationship management, and IP address pool management;
    a forwarding strategy management module configured to implement switcher request processing, forwarding strategy generation, and forwarding strategy distribution; and
    a traffic guiding management module configured to implement traffic guiding strategy management and traffic guiding configuration distribution.

12. A non-transitory computer-readable device having a computer program stored thereon, which, when executed by a processor, implements the SDN-based VPN traffic scheduling method according to claim 1.

13. A computer device, comprising a memory, a processor, and a computer program stored on the memory and executable on the processor, wherein the processor is to implement the SDN-based VPN traffic scheduling method according to claim 1 when the computer program is executed by the processor.

* * * * *